United States Patent

Okazaki

[11] Patent Number: 5,807,206
[45] Date of Patent: Sep. 15, 1998

[54] CONTROL DEVICE FOR TOROIDAL TYPE CONTINUOUSLY VARIABLE TRANSMISSION

[75] Inventor: Makoto Okazaki, Fuji, Japan

[73] Assignee: Jatco Corporation, Japan

[21] Appl. No.: 799,733

[22] Filed: Feb. 12, 1997

[30] Foreign Application Priority Data

Feb. 22, 1996 [JP] Japan .................................. 8-060229

[51] Int. Cl.⁶ .................................................. F16H 15/38
[52] U.S. Cl. ............................ 477/98; 477/37; 476/10
[58] Field of Search ................................. 475/186, 254; 477/37, 98, 50; 476/1, 3, 10

[56] References Cited

U.S. PATENT DOCUMENTS

| | | | |
|---|---|---|---|
| 4,744,032 | 5/1988 | Miyaura et al. | 476/3 X |
| 5,052,236 | 10/1991 | Nakano | 476/10 X |
| 5,518,468 | 5/1996 | Sametz et al. | 477/98 X |
| 5,558,597 | 9/1996 | Oba et al. | 477/98 |
| 5,643,132 | 7/1997 | Inoue | 477/50 X |
| 5,665,021 | 9/1997 | Inoue | 477/37 X |
| 5,674,145 | 10/1997 | Kidokoro et al. | 476/3 X |
| 5,707,313 | 1/1998 | Suzuki | 477/43 |
| 5,711,741 | 1/1998 | Inoue | 477/37 X |

Primary Examiner—Charles A. Marmor
Assistant Examiner—Peter T. Kwon
Attorney, Agent, or Firm—Rossi & Associates

[57] ABSTRACT

A control device for a toroidal type continuously variable transmission is provided which controls the speed ratio of the toroidal type continuously variable transmission depending upon a current throttle opening and a current vehicle speed. This transmission includes an input disc and an output disc having mutually facing toroidal faces with oil films formed thereon, and a friction roller disposed between the input disc and the output disc to effect power transmission therebetween such that the speed ratio is changed by controlling an angle of inclination of the friction roller. The control device of the invention determines a temperature of the oil films, and sets at least one of an upper limit and a lower limit of the angle of inclination based on the determined temperature of the oil films, so that the speed ratio is controlled within the range of the angle of inclination set by the control device.

3 Claims, 6 Drawing Sheets

| OIL SAMPLE | KINEMATIC VISCOSITY cSt | | VI |
|---|---|---|---|
| | 40°C | 100°C | |
| A | 96.1 | 9.35 | 60 |
| B | 31.1 | 5.66 | 123 |
| C | 38.8 | 4.78 | −24 |
| D | 10.3 | 2.46 | 36 |
| E | 61.51 | 11.1 | 175 |

CONTROL DEVICE FOR TOROIDAL TYPE CONTINUOUSLY VARIABLE TRANSMISSION

BACKGROUND OF THE INVENTION

1. Field of the Invention

The present invention relates to a control device for a toroidal type continuously variable transmission, which is adapted to continuously change the speed ratio of the toroidal type continuously variable transmission by controlling an angle of inclination of friction roller disposed between an input disc and an output disc.

2. Description of Prior Art

The toroidal type continuously variable transmission is adapted to obtain a steplessly changing output speed by applying its continuously changing speed ratio on the input engine speed, and is thus different from a conventional automatic transmission whose speed ratio or gear ratio is changed in steps by means of a planetary gear system.

In this toroidal type continuously variable transmission, an input disc and an output disc provide mutually facing toroidal faces having oil films formed thereon, such that these toroidal faces are connected to each other by friction rollers. This type of transmission effects so-called traction conduction in which two rolling elements transmit power through a considerably thin oil film under a high pressure.

The speed ratio of the toroidal type continuously variable transmission can be set steplessly or continuously by controlling the angle of inclination of the friction rollers so as to change the ratio of diameters of contact portions of the friction rollers that contact with the input disc and the output disc.

A method of controlling the speed ratio of such a toroidal type continuously variable transmission is disclosed in Japanese laid-open Patent Publication No. 1-295070. In the disclosed transmission, a pair of friction rollers are supported on a side face of a frame structure supported by the upper and lower ends of a transmission case such that the friction rollers can rotate and swing relative to the frame structure. The axis of rotation of each friction roller is eccentrically supported by the frame structure, and the angle of inclination of the friction roller is controlled according to a change in the amount of bias force applied in the vertical direction to the frame structure.

In the toroidal type continuously variable transmission, the power transmission is effected through considerably thin oil films between the toroidal faces and the friction rollers. If the transmitted torque increases so much that excessive shear force that exceeds the strength of the oil films is applied to the oil films, therefore, the oil films are broken and the normal power transmitting condition is lost, whereby the surfaces of the friction rollers come into direct contact with the toroidal faces.

The toroidal faces of the input and output discs and the surfaces of the friction rollers are finely mirror-finished so as to stably retain or hold the considerably thin oil films thereon. If these mirror finished surfaces are roughened due to direct contact of materials of the input and output discs and friction rollers, these surfaces cannot stably retain or hold the oil films thereon, resulting in deterioration of the power transmitting capability of the toroidal type continuously variable transmission, and the angle of inclination of the friction rollers cannot be continuously and smoothly controlled.

In the toroidal type continuously variable transmission, the radii of rotation of the contact portions of the friction rollers are reduced with a decrease in the diameter sizes (aperture) of the toroidal faces of the input disc and output disc, causing large shear force to be applied to the oil films even without an increase in the transmitted torque. Accordingly, the dimensions of the input and output discs are determined depending upon the performance and nature of the oil (traction oil) used.

For example, the diameter of the bottom of the toroidal faces of the input disc and output disc is determined so that the shear is force caused by the maximum output torque of the engine does not exceed the strength of the oil films even with the minimum radius of rotation of the contact portions at the upper limit and lower limit of the angle of inclination of the friction rollers.

If an oil that provides oil films having a high strength is used, the diameter of the input disc and output disc can be reduced so as to reduce the size and weight of the toroidal type continuously variable transmission. However, the oil whose films have a high strength generally exhibits a high viscosity and insufficient flowability, and thus cannot ensure a normal circulating condition unless the oil pressure is increased. As a result, separation and collection of the oil from the mechanism tends to be unstable, and bubbles included in the oil cannot be easily removed. Accordingly, the air is likely to enter the oil pump, thus making the operation of the hydraulic control system unstable.

An oil having a low viscosity, on the other hand, has excellent flowability, and thus permits the hydraulic control system to be stably operated with high efficiency. The low-viscosity oil, however, forms oil films having only a small strength, making it necessary to increase the diameter sizes of the toroidal faces of the input disc and output disc so as to reduce the shear force applied to the oil films. This results in an increase in the size of the toroidal type continuously variable transmission.

If an oil is used at a high temperature, the flowability increases but the strength of the oil films is reduced irrespective of the viscosity of the oil, with a result of an increased possibility that the oil films are broken even if the shear force is at such a level that is endurable in a low temperature range. If the oil is used at a low temperature, the strength of the oil films increases but the flowability becomes insufficient, with a result of delayed or unstable operations of the hydraulic control system. Accordingly, large-sized input disc and output disc need to be employed in view of a sufficiently high safety factor so as to assure a sufficient oil film condition even where the oil is used at a considerably high temperature, or a cooling/heating device or complicated temperature control device needs to be installed so as to strictly control the oil temperature.

SUMMARY OF THE INVENTION

It is therefore an object of the present invention to provide a control device for a toroidal type continuously variable transmission, which eliminates a concern about breakage of oil films even with small diameters of input disc and output disc and a large variation in the oil temperature, and is thus able to maintain stable operations of the toroidal type continuously variable transmission.

To accomplish the above object, there is provided a control device for a toroidal type continuously variable transmission, which controls a speed ratio of the toroidal type continuously variable transmission depending upon a current throttle opening and a current vehicle speed, the transmission including an input disc and an output disc having mutually facing toroidal faces with oil films formed thereon, and a friction roller having an angle of inclination disposed between the input disc and the output disc to effect power transmission therebetween such that the speed ratio is changed by controlling an angle of inclination of the friction roller, which control device comprises: determining means for determining a temperature of the oil films; and setting means for setting at least one of an upper limit and a lower limit of said angle of inclination based on said temperature of said oil films determined by said determining means; wherein the speed ratio is controlled within a range of the angle of inclination set by the setting means.

The control device for the toroidal type continuously variable transmission restricts at least one of the upper limit and lower limit of the angle of inclination of the friction roller if the temperature of the oil films is increased, so as to reduce the range in which the speed ratio can be controlled. The speed ratio of the toroidal type continuously variable transmission corresponds one-to-one to the angle of inclination of the friction roller, and the upper limit and lower limit of the angle of inclination correspond to the maximum speed ratio possible and the minimum speed ratio possible (overdrive speed ratio), respectively.

If the friction roller extends in parallel with the axis of rotation of the input disc and output disc (if the angle of inclination of the friction roller is 0), the radius of rotation of a contact portion of the friction roller that contacts with the input disc becomes almost equal to that of a contact portion of the friction roller that contacts with the output disc, and the shear force applied to the oil film at one of these contact portions becomes almost equal to that at the other contact portion.

If the friction roller is inclined in such a direction as to increase the radius of rotation of the contact portion of the friction roller that contacts the input disc (if the angle of inclination approaches the lower limit or the speed ratio is reduced to be less than 1), the shear force applied to the oil film is lowered at the contact portion of the friction roller on the side of the input disc, while the shear force applied to the oil film is increased at the contact portion of the friction roller on the side of the output disc where the radius of rotation is reduced. Accordingly, if the strength of the oil films is reduced with an increase in the temperature of the oil films, the lower limit of the angle of inclination is raised so as to increase the radius of rotation of the contact portion on the side of the output disc.

If the friction roller is inclined in such a direction as to reduce the radius of rotation of the contact portion of the friction roller that contacts the input disc (if the angle of inclination approaches the upper limit or the speed ratio is increased), the shear force applied to the oil film is lowered at the contact portion of the friction roller on the side of the output disc where the radius of rotation is increased, while the shear force applied to the oil film is increased at the contact portion of the friction roller on the side of the input disc. Accordingly, if the strength of the oil films is reduced with an increase in the temperature of the oil films, the upper limit of the angle of inclination is lowered so as to increase the radius of rotation of the contact portion on the side of the input disc.

According to the present invention as described above, the control range of the speed ratio is increased by increasing the angle of inclination of the friction roller where the temperature of the oil films is in a low range, while the control range of the speed ratio is reduced by limiting the inclination of the friction roller if the temperature of the oil films increases. This arrangement eliminates a concern that the increase in the temperature of the oil films may result in excessive torque transmission. Thus, a normal torque transmission due to traction conduction can be maintained between the input disc and the friction roller and between the friction roller and the output disc, thus avoiding roughed or damaged toroidal faces due to breakage of the oil films.

Since the strength of the oil films need not be estimated to be excessively low in view of a considerably high temperature, the diameter sizes of the toroidal faces of the input disc and output disc may be reduced thereby to provide a small-sized, light toroidal type continuously variable transmission.

Since excessive torque transmission can be avoided by restricting the angle of inclination of the friction roller even when an oil whose film has a low strength (traction coefficient) is used, the oil can be selected in view of the flowability of the oil at a low temperature.

In one preferred form of the invention, the above-indicated determining means may determine the temperature of the oil films based on a temperature of an oil measured immediately before the oil is supplied to the toroidal faces of said input disc and said output disc.

In the control device for the toroidal type continuously variable transmission of the above form, the control device estimates the temperature of the oil films at the contact portions of the friction roller on the side of the input disc and output disc, by detecting the temperature of the oil immediately before it is supplied to the input disc and output disc.

Since the temperature of the oil films is judged from the temperature of the oil measured just before it is supplied to the toroidal faces, the position of a temperature sensor may be selected with increased freedom, and the temperature sensor need not directly detect the surface temperature of the toroidal faces.

In another preferred form of the invention, the above-indicated setting means may maintain the upper limit and the lower limit of the angle of inclination while the temperature of the oil films determined by the determining means is in a low range, and lowers the upper limit of the angle of inclination by a predetermined value and raises the lower limit of the angle of inclination by a predetermined value if the temperature of the oil films exceeds a predetermined threshold value.

In the control device for the toroidal type continuously variable transmission of the above form, the range of the speed ratio can be set in two steps or selected between two ranges depending upon the temperature of the oil films. While a relatively wide range (normal range) of the speed ratio is used where the temperature is in a range up to the threshold value, a relatively narrow range of the speed ratio, which corresponds to a narrow range of the angle of inclination, is used where the temperature is in a high range that exceeds the threshold value. The narrow range of the angle of inclination of the friction roller is obtained by shifting inward the upper and lower limits of the angle of inclination.

Since the available range of the angle of inclination of the friction roller is switched in two steps, the control is easier than the case where the range is switched in three or more steps or steplessly. Further, the range of the speed ratio is kept constant over a wide temperature range, and the same accelerating response of the vehicle body can be reproduced in response to depression of an accelerator pedal by a driver, thus giving the driver an increased sense of security compared to the case where the range of the speed ratio is frequently changed.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENT

Figure 1:
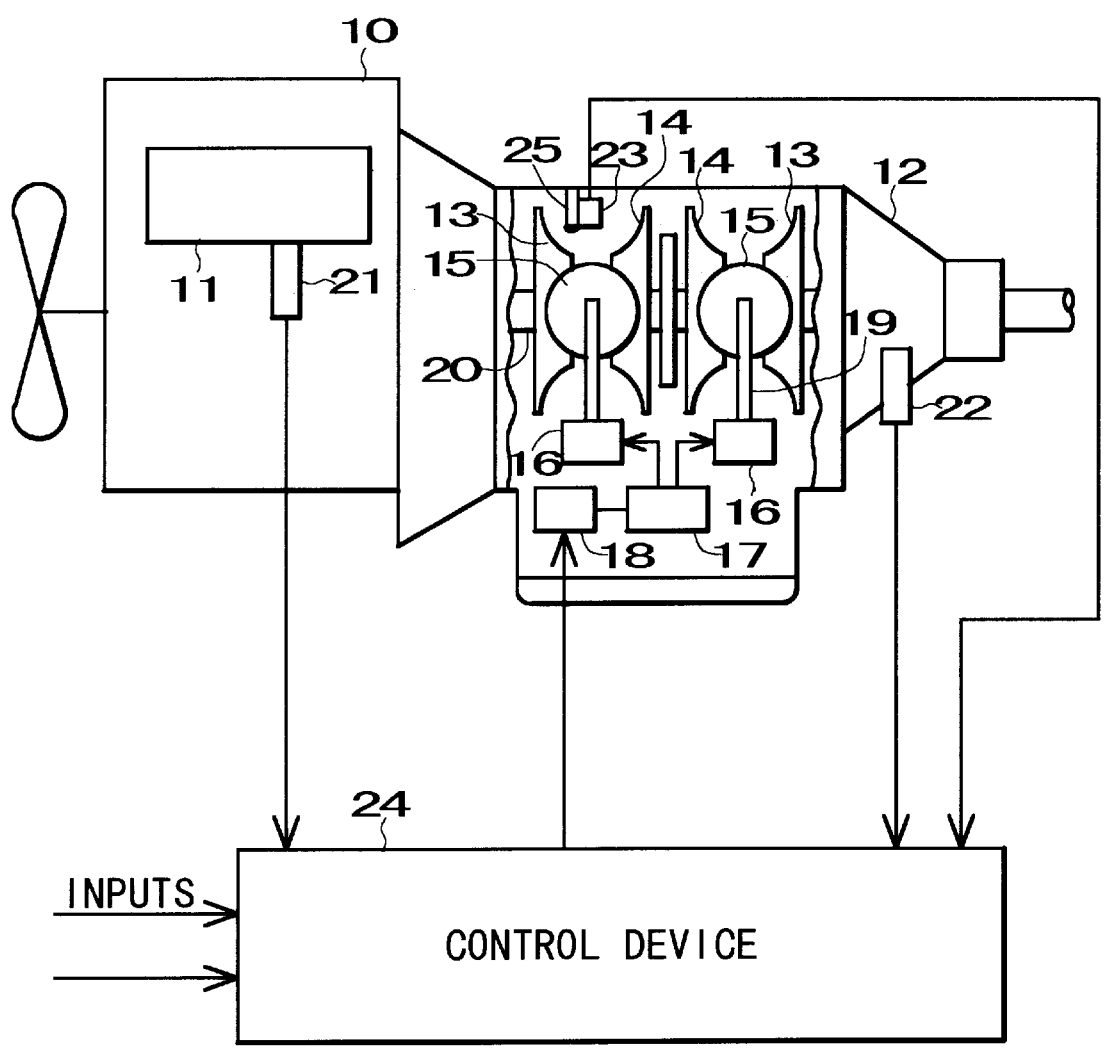
FIG. 1 is a view explaining a control system of a toroidal type continuously variable transmission.
Figure 2:
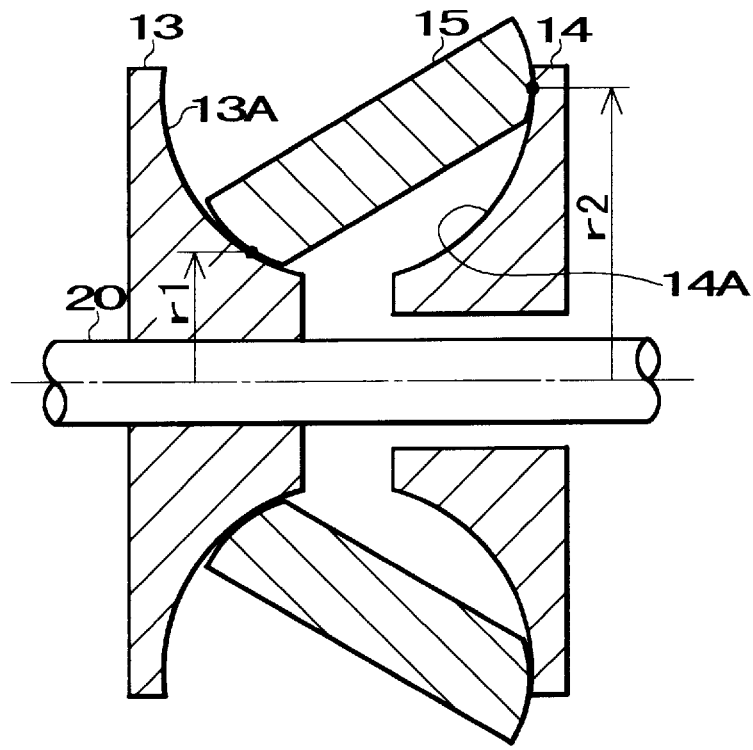
FIG. 2 is a view showing frictional rollers that are in contact with an input disc and an output disc of the transmission.
Figure 3:
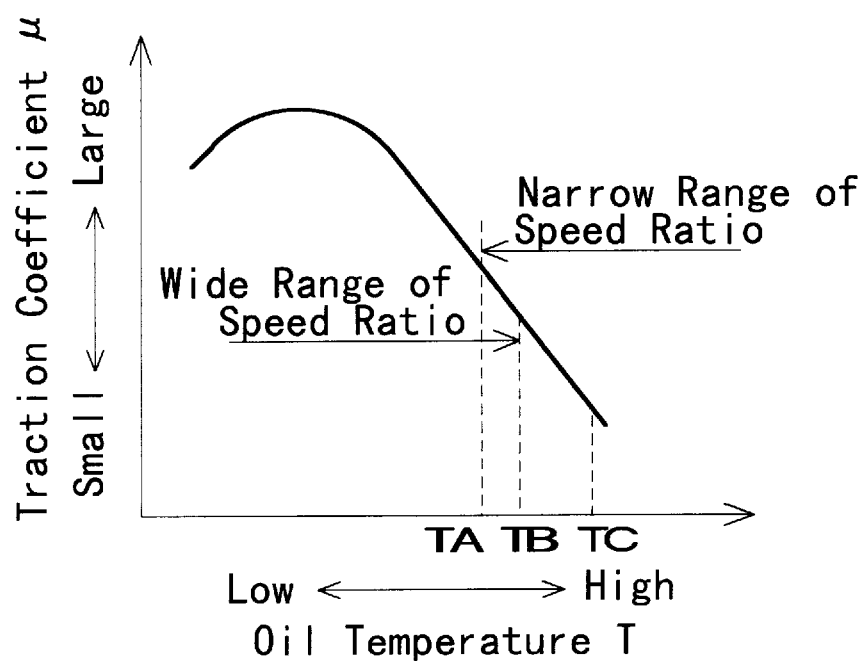
FIG. 3 is a graph showing the relationship between the traction coefficient and the oil temperature.
Figure 4:
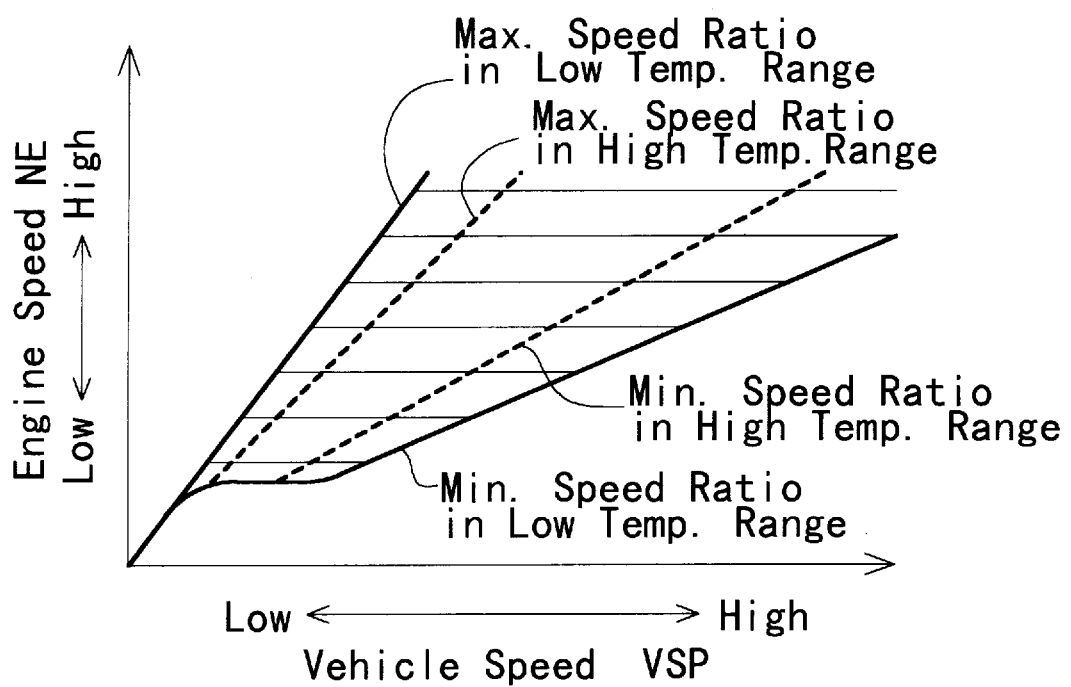
FIG. 4 is a view for explaining control of the speed ratio of the transmission.
Figure 5:
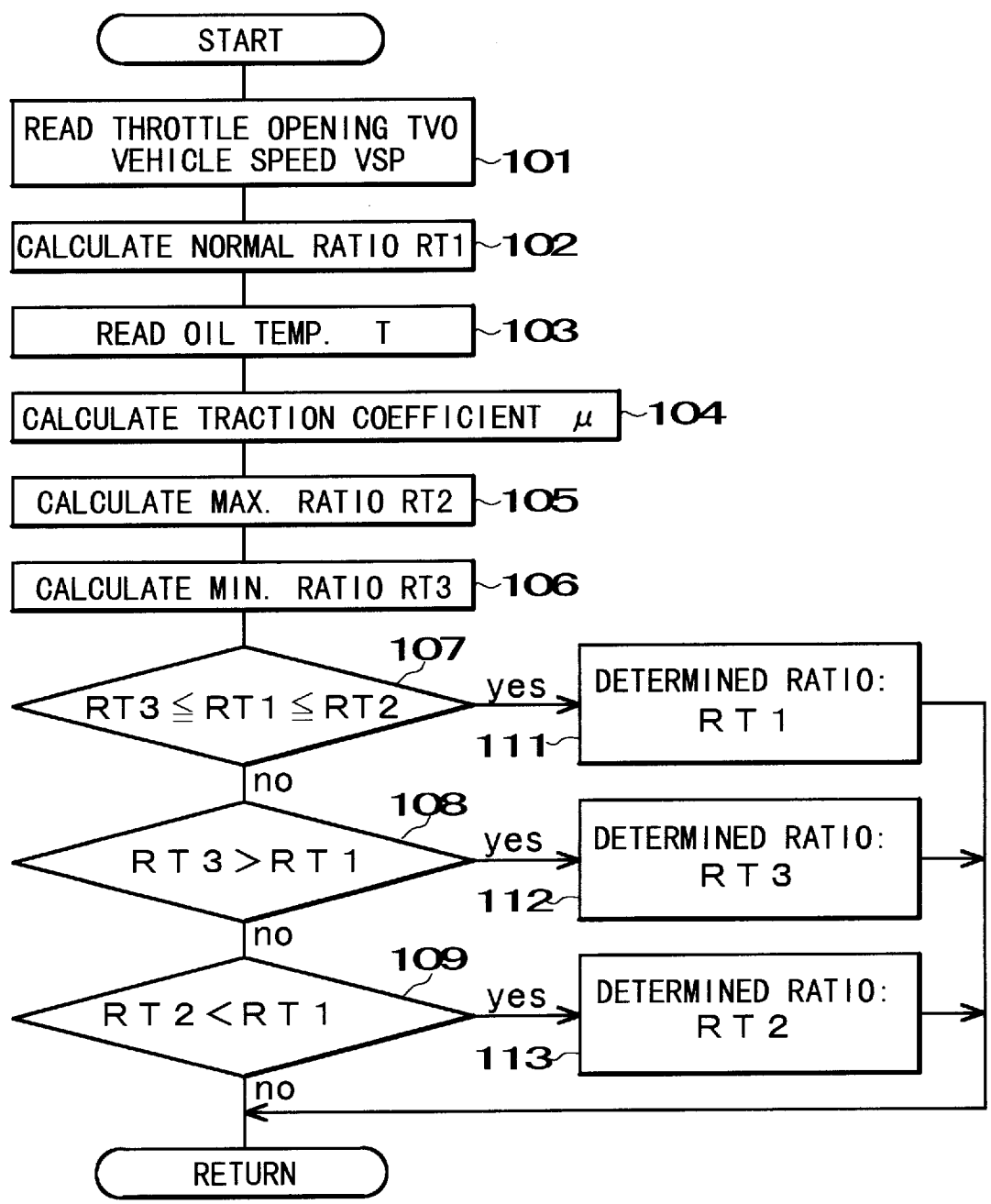
FIG. 5 is a flow chart of control of the present embodiment.
Figures 6A, 6B:
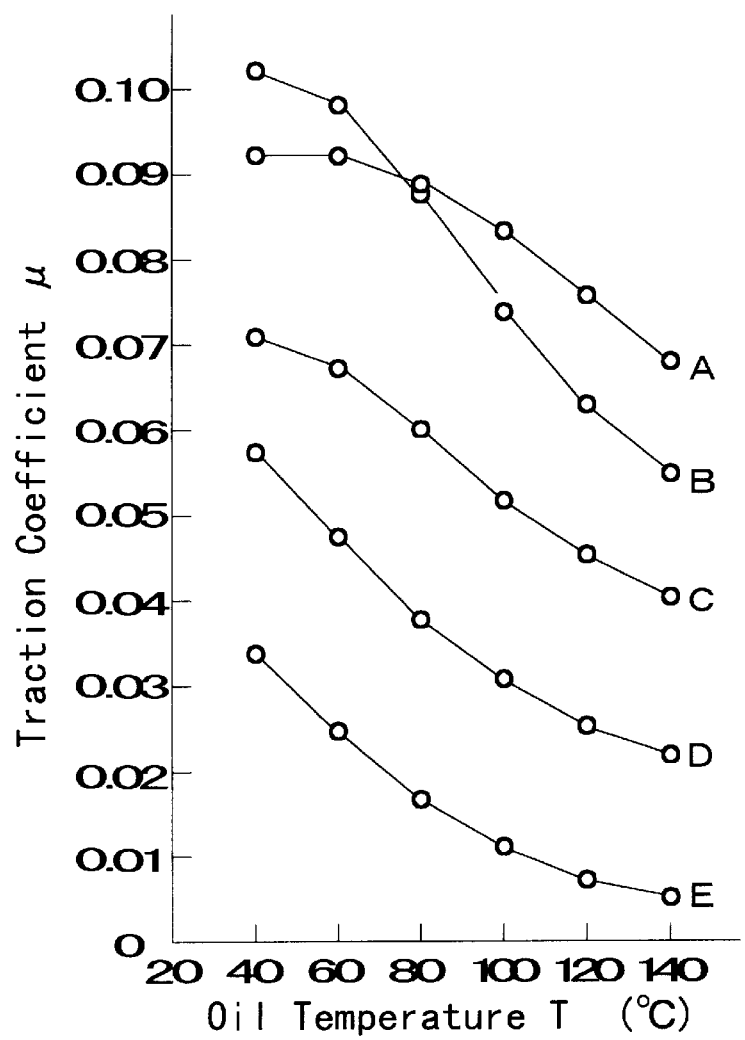
FIGS. 6A and 6B are views explaining temperature characteristics of an oil.
Figure 7:
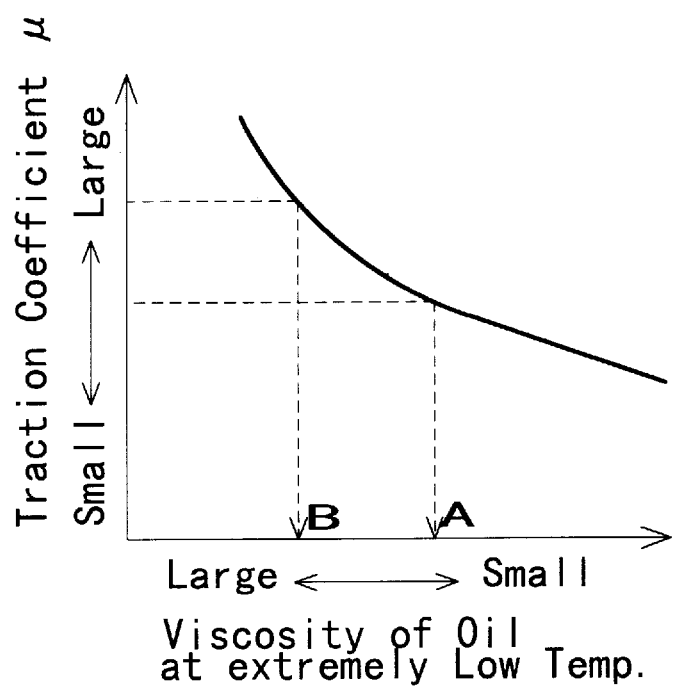
FIG. 7 is a view explaining a general nature of the oil.

Referring to FIG. 1 through FIG. 7, there will be described a control device according to one embodiment of the present invention. FIG. 1 is a view explaining a control system of a toroidal type continuously variable transmission, FIG. 2 is a view showing frictional rollers that are in contact with an input disc and an output disc, FIG. 3 is a graph showing the relationship between the traction coefficient and the oil temperature, FIG. 4 is a view explaining control of the speed ratio of the transmission, FIG. 5 is a flow chart of control of the present embodiment, FIGS. 6A and 6B are views explaining temperature characteristic of an oil, and FIG. 7 is a view explaining a general nature of the oil. FIG. 6A shows the temperature characteristic of the kinematic viscosity of the oil, and FIG. 6B shows the temperature characteristic of the traction coefficient.

As shown in FIG. 1, a toroidal type continuously variable transmission 12 is adapted to steplessly or continuously change the speed of rotation of the engine 10. The output of the engine 10 is transmitted from a main shaft 20 to a pair of input discs 13 located on the outer side, through a torque converter (not shown) provided in the transmission 12. The rotation of the input discs 13 is transmitted through friction rollers 15 to a pair of output discs 14 located on the inner side. The rotating speed of the input discs 13 is changed depending upon the angle of inclination of the friction rollers 15, so that the output discs 14 are rotated at the speed thus changed.

Four friction rollers 15 in total are provided in which the axis of each pair of the rollers 15 are arranged perpendicular in a plane perpendicular to the plane of the paper having FIG. 1, and are rotatable about their own axes of rotation. The rotation axis of each of the friction rollers 15 is eccentrically supported by a support 19 that is vertically movably supported, such that the roller 15 can swing or pivot about the support 19.

The angle of inclination of the friction rollers 15 corresponds one-to-one to the speed ratio of the toroidal type continuously variable transmission 12, and is controlled depending upon the force to push up the supports 19 by respective actuators 16. When the actuator 16 pushes up the axis of rotation of each frictional roller 16 through the corresponding support 19, the balance of forces applied from the input disc 13 and output disc 14 to the frictional roller 15 is lost, and the friction roller 15 changes its posture by itself within the plane including the direction perpendicular to the plane of the paper having FIG. 1 and the axial direction of the main shaft 20.

The force of the actuators 16 to push up the supports 19 is controlled by a control valve 17 for supplying oil pressures to the actuators 16. The control valve 17 sets the force to push up the supports 19 with high accuracy and stability, according to the operating amount of a step motor 18 for driving the valve 17

A control device 24 changes the operating amount of the step motor 18 by controlling electric power supplied to the step motor 18, so as to establish a required speed ratio of the toroidal type continuously variable transmission 12.

The control device 24 consists of a micro circuit that is a unit of various memories, input and output circuits and others, and is adapted to perform certain arithmetic processing according to processing programs stored in the memories to deal with input information, so as to control the speed ratio of the toroidal type continuously variation transmission 12 to a suitable value that matches the current driving conditions.

More specifically, the control device 24 calculates the current throttle opening TV0 based on the output of a throttle sensor 21 provided in a throttle valve 11 of the engine 10, and calculates the current vehicle speed VSP based on the output of a vehicle sensor 22 provided on the output side of the toroidal type continuously variable transmission 12. The control device 24 also calculates the current oil temperature T based on the output of an oil temperature sensor 23 adapted to detect the temperature of an oil that is about to be supplied to toroidal faces.

FIG. 2 shows the state in which the power transmission is effected between a pair of input disc 13 and output disc 14 through one of the friction rollers 15. The maximum torque Q that can be transmitted by the friction roller 15 is represented by the following equation (1):

$$Q = k \times r \times U \times F \quad (1)$$

where k is constant, r is radius of rotation of a contact point, $\mu$ is traction coefficient (apparent kinematic coefficient) that is a characteristic of an oil film at the contact point, and F is force to press the friction roller 15 against the input disc 13 (or output disc 14).

The radius of rotation r is the smaller one of the distance r1 from a contact point of a toroidal face 13A to the center of the main shaft 20, and the distance r2 from a contact point of a toroidal face 14A to the center of the main shaft 20.

Although the transmittable maximum torque Q increases as the pressing force F increases according to the above equation (1), the pressure at the contact points increases with an increase in the pressing force F, resulting in reduction of the fatigue life of the input disc 13, output disc 14 and friction roller 15, for example.

Although the transmittable maximum-torque Q also increases if an oil having a large traction coefficient $\mu$ is used, such an oil having a large traction coefficient $\mu$ has various problems as described later.

The radius r of rotation of the input disc 13 decreases as the speed ratio of the toroidal type continuously variable transmission 12 increases, and the radius r of rotation of the output disc 14 decreases as the speed ratio becomes less than 1 (overdrive speed ratio). Accordingly, the radius r of rotation of the input disc 13 that corresponds to the maximum speed ratio and the radius r of the output disc 14 that corresponds to the minimum speed ratio may be increased so as to increase the transmittable maximum torque Q.

If the diameters of the input and output discs 13, 14 are increased to increase the radii of rotation thereof, however, the sizes and axial dimensions of the input disc 13 and output disc 14 are also increased.

If the angle of inclination of the friction roller 15 is limited so as not to use portions of the toroidal faces 13A, 14A having a small radius r of rotation, on the other hand, the available range of the speed ratio is reduced, resulting in insufficient starting (accelerating) performance of the vehicle and an increase in the fuel consumption at a high speed.

As shown in FIG. 3, the traction coefficient $\mu$ is lowered in a region where the oil temperature T is high, as compared with a region where the oil temperature T is low. In the prior art, therefore, the diameter sizes of the toroidal faces 13A, 14A of the input disc 13 and output disc 14 are determined based on the maximum torque Q of the engine 10, in view of a considerably low traction coefficient $\mu$ at the predictable maximum oil temperature TC, so as to set limit values that define the available range of the speed ratio of the transmission.

The control device 24 of the present invention, on the other hand, allows the friction roller 15 to be largely inclined by making a small radius r of rotation available when the temperature T is in a low range where the traction coefficient $\mu$ is high, and restricts inclination of the friction roller 15 by only allowing a relatively large radius r of rotation when the oil temperature T exceeds a threshold value TB with a result of reduction in the traction coefficient $\mu$. Namely, the control device 24 lowers the upper limit of the speed ratio and at the same time increase the lower limit thereof if the oil temperature T exceeds a predetermined threshold value, so as to reduce or narrow an available range of the speed ratio as compared with the case where the temperature T is lower than the threshold value.

To avoid useless switching of the available range of the speed ratio so as to stabilize the speed ratio range at around the threshold value TB, the control device 24 give a hysteresis characteristic to the switching control of the speed ratio range, as shown in FIG. 3. While the temperature T is in the process of decreasing, the restriction or limitation to the range of the speed ratio is removed at the time when the oil temperature T is lowered to a threshold value TA which is lower than the above threshold value TB that is used for switching while the temperature T is in the process of increasing.

FIG. 4 shows the ranges of the speed ratio used by the control device 24. In this figure, the line having the smaller slope, which indicates a small increase in the engine speed NE with an increase in the vehicle speed VSP, corresponds to the smallest speed ratio, namely, the overdrive speed ratio. On the other hand, the straight line having the larger slope, which indicates a large increase in the engine speed NE with an increase in the vehicle speed VSP, corresponds to the largest speed ratio.

In the low range of the engine speed NE, the speed ratio is uniformly increased so as to reduce the load of the engine 10. When the engine speed NE is in the other range, the available range of the speed ratio is switched between two ranges, depending upon the oil temperature T.

If the throttle opening TV0 is increased, the control device 24 increases the speed ratio so as to assure a sufficiently large output level of the powertrain that is needed for desired acceleration and grade ability of the vehicle. If the throttle opening TV0 is reduced, on the other hand, the control device 24 reduces the speed ratio so as to improve the fuel efficiency and reduce noises.

When the oil temperature T is in a low range, the control device 24 changes the speed ratio depending upon the throttle opening TV0, within the larger range delimited by two solid lines in FIG. 4 that represent the largest speed ratio and the smallest speed ratio, respectively. As the oil temperature T increases, the control device 24 changes the speed ratio within the smaller range delimited by two broken lines in FIG. 4 that represents the largest speed ratio and the smallest speed ratio, respectively.

The control device 24 controls the toroidal type continuously variable transmission 12 according to the flow chart of FIG. 5.

Step 101 is initially executed to read the throttle opening TV0 and vehicle speed VSP that are computed from the outputs of the throttle sensor 21 and vehicle sensor 22, respectively. In step 102, a normal speed ratio RT1 is calculated based on the throttle opening TV0 and vehicle speed VSP. The normal speed ratio RT1 is the speed ratio in which the vehicle runs with a high fuel efficiency while assuring required output performance of the powertrain as described above. Step 103 is then executed to read the oil temperature T that is computed from the output of the oil temperature sensor 23.

In step 104, the traction coefficient $\lambda$ is calculated based on the kind of the oil used and the oil temperature T. As shown in FIG. 3, the traction coefficient $\lambda$ at the oil temperature TB is employed until the oil temperature T increases up to the level TB or after the oil temperature T decreases down below the level TA. After the oil temperature T exceeds the level TB during its increasing process, or before the oil temperature T becomes lower than the level TA during its decreasing process, on the other hand, the traction coefficient $\mu$ at the oil temperature TC is employed, which temperature TC is set at a high level in view of the safety factor.

In the above step 104, the traction coefficient $\mu$ is changed in steps with reference to two threshold values (temperature levels TA, TB). In steps 105 and 106, the upper limit and lower limit of the speed ratio (=upper limit and lower limit of the angle of inclination of the friction rollers 15) are determined depending upon the traction coefficient $\mu$ thus changed in step 104. In steps 107–109 and 111–113, a currently speed ratio is set in the range between the upper limit and the lower limit.

In step 105, the minimum radius r of rotation, which is used to transmit the maximum output of the engine 10 between the input disc 13 and output disc 14, is calculated according to the above-indicated equation (1), using the traction coefficient $\mu$ calculated in step 104, and the largest (maximum) speed ratio RT2 corresponding to the minimum radius r of rotation is calculated. Similarly, in step 106, the smallest speed ratio RT3 corresponding to the minimum radius r of rotation is calculated.

In step 107, it is determined whether the normal speed ratio RT1 exists in the range from the smallest speed ratio RT3 to the largest speed ratio RT2. If the normal speed ratio is present in this range, step 111 is executed to determine that the power can be normally transmitted between the toroidal faces 13A, 14A and the friction rollers 15, and employ the normal speed ratio RT1 so that the speed ratio of the transmission is continuously and steplessly changed by inclining the friction rollers 15 until the i current speed ratio becomes equal to the normal speed ratio RT1. If the normal speed ratio RT1 is not present in the above-indicated range, the control flow proceeds to step 108.

In step 108, it is determined whether the normal speed ratio RT1 is less than the smallest speed ratio RT3 or not. If it is less than the smallest speed ratio, step 112 is then executed to determine that normal power transmission between the toroidal face 14A and the friction rollers 15 is difficult to be achieved, and employs the smallest speed ratio RT3 to place the transmission in such a condition where the angle of inclination of the friction rollers 15 is fixed at a value corresponding to the smallest speed ratio RT3. In this case, the angle of inclination does not become smaller than the fixed value. If the normal speed ratio RT1 is not less than the smallest speed ratio RT3, the control flow goes to step 109.

In step 109, it is determined whether the normal speed ratio RT1 exceeds the largest speed ratio RT2 or not. If it exceeds the largest speed ratio RT2, step 113 is then executed to determine that normal power transmission between the toroidal face 13A and the friction rollers 15 is difficult to be achieved, and employs the largest speed ratio RT2 to place the transmission in such a condition where the angle of inclination of the friction rollers 15 is fixed at a value corresponding to the largest speed ratio RT2. In this case, the angle of inclination does not become larger than the fixed value.

As shown in FIG. 6A, the kinematic viscosity of the oil varies depending upon the kind and temperature of the oil. The viscosity index VI in the right column represents the rate of change of the kinematic viscosity with respect to temperature changes, and an increase in its value indicates that the kinematic viscosity decreases at a higher rate as the temperature decreases. Oils A, B, C and D are so-called traction oils that have been developed for use in toroidal type continuously variable transmissions. Oil E is an ordinary engine oil. The oils B, C, D have relatively low kinematic viscosities even at a low temperature as compared with the oils A, E, and exhibit excellent flowability.

As shown in FIG. 6B, the traction coefficient $\mu$ of the oil varies depending upon the kind and temperature of the oil. The oils A, B, C, D exhibit much higher traction coefficients $\mu$ than the oil E, and are thus able to increase the maximum torque Q transmittable between the toroidal faces 13A, 14A and the friction rollers 15, thereby to reduce the size of the toroidal type continuously variable transmission 12.

In any event, the traction coefficient $\mu$ is reduced to a large extent as the oil temperature T increases. If the toroidal type continuously variable transmission is designed in view of the traction coefficient $\mu$ at a high temperature, therefore, a high traction coefficient $\mu$ in a low temperature range of the oil cannot be effectively utilized.

As shown in FIG. 7, as a general tendency of the nature of the oil, the larger the kinematic viscosity at an extremely low temperature such as below 0° C., the larger the traction coefficient $\mu$ over the entire temperature range. Although a large quantity of power can be transmitted between the input disc 13 and output disc 14 if an oil having a large traction coefficient $\mu$ is used, the kinematic viscosity undesirably increases at the extremely low temperature, with a result of insufficient flowability. As a result, the operation of hydraulic cylinders is delayed, and the time required for engaging a multiple disc clutch or a multiple disc brake is prolonged, resulting in an increase in a delay time (select time lag) measured from the time when a driver operates a select lever until the time when the toroidal type continuously variable transmission responds to the selecting operation.

In the toroidal type continuously variable transmission of the present embodiment, a relatively wide range of the speed ratio is employed in a relatively low range of the oil temperature T, and a relatively narrow range of the seed ratio is employed in a relatively high range of the oil temperature T. Thus, the present continuously variable transmission can effectively utilize a high traction coefficient $\mu$ of the oil in the low range of the oil temperature T, and is also free from shear force exceeding the strength of the oil film, which force would be otherwise applied to the oil film in the high range of the oil temperature T, whereby a normal power transmitting state due to traction conduction can be maintained between the toroidal faces 13A, 14A and the friction rollers 15. Even if the oil temperature becomes considerably high, the present continuously variable transmission can achieve power transmission that suites the lowered traction coefficient $\mu$ by reducing the range of the speed ratio, and thus can avoid damages of the toroidal faces 13A, 14A.

Accordingly, the input disc 13 and output disc 14 may be designed to have reduced diameter sizes of their toroidal faces 13A, 14A, as compared with the case where the diameter sizes are determined in view of a low traction coefficient, taking too much account of the safety. Thus, the toroidal type continuously variable transmission 12 as a whole can be reduced in the size and weight.

Since there is no need to use an oil having a high viscosity in order to provide a high traction coefficient, an oil having a relatively low viscosity may be used to achieve highly efficient oil circulation in a hydraulic circuit, high response speed of the hydraulic cylinders, effective lubrication and removal of heat of the mechanism. With high flowability of the oil ensured even at an extremely low temperature, the select time lag is shorted even immediately after starting of the engine in winter, assuring high efficiency with which the toroidal type continuously variable transmission 12 is operated.

While the available range of the speed ratio is switched between two ranges with reference to the predetermined threshold values in the illustrated embodiment, the range of the speed ratio may be selected among more than two ranges upon changes of the oil temperature T, or the range of the speed ratio may be continuously changed using the traction coefficient corresponding the oil temperature as it is. In either case, the toroidal type continuously variable transmission can effectively utilize a high traction coefficient in a low temperature range, while avoiding excessive torque transmission in a high temperature range.

In FIG. 5, step 103 corresponds to determining means, and steps 104, 105 and 106 correspond to setting means of the present invention.

What is claimed is:

1. A control device for a toroidal type continuously variable transmissions which controls a speed ratio of the toroidal type continuously variable transmission depending upon a current throttle opening and a current vehicle speed, said transmission including an input disc and an output disc having mutually facing toroidal faces with oil films formed thereon, and a friction roller disposed between said input disc and said output disc to effect power transmission therebetween such that the speed ratio is changed by controlling an angle of inclination of the friction roller, comprising:

determining means for determining a temperature of said oil films; and setting means for setting at least one of an upper limit and a lower limit of said angle of inclination based on said temperature of said oil films determined by said determining means; wherein said speed ratio is controlled within a range of said angle of inclination set by said setting means.

2. A control device for a toroidal type continuously variable transmission as defined in claim 1, wherein said determining means determines said temperature of said oil films based on a temperature of an oil measured immediately before the oil is supplied to said toroidal faces of said input disc and said output disc.

3. A control device for a toroidal type continuously variable transmission as defined in claim 1 or claim 2, wherein said setting means maintains the upper limit and the lower limit of said angle of inclination while said temperature of said oil films determined by said determining means is in a low range, and lowers the upper limit of the angle of inclination by a predetermined value and raises the lower limit of the angle of inclination by a predetermined value if the temperature of the oil films exceeds a predetermined threshold value.

\* \* \* \* \*